United States Patent
Yamamoto et al.

(10) Patent No.: US 10,049,699 B2
(45) Date of Patent: Aug. 14, 2018

(54) DISC TRAY AND TRAY HOLDER

(71) Applicant: Panasonic Intellectual Property Management Co., Ltd., Osaka (JP)

(72) Inventors: Yoichi Yamamoto, Osaka (JP); Shinichi Maeda, Osaka (JP); Norikatsu Yoshida, Hyogo (JP); Shuji Tabuchi, Okayama (JP)

(73) Assignee: Panasonic Intellecutal Property Management Co., Ltd., Osaka (JP)

( * ) Notice: Subject to any disclaimer, the term of this patent is extended or adjusted under 35 U.S.C. 154(b) by 0 days.

(21) Appl. No.: 15/793,719

(22) Filed: Oct. 25, 2017

(65) Prior Publication Data

US 2018/0144773 A1 May 24, 2018

(30) Foreign Application Priority Data

Nov. 21, 2016 (JP) .................... 2016-225907

(51) Int. Cl.
*G11B 23/03* (2006.01)
*G11B 23/00* (2006.01)

(52) U.S. Cl.
CPC ...... *G11B 23/0323* (2013.01); *G11B 23/0035* (2013.01); *G11B 23/0316* (2013.01)

(58) Field of Classification Search
None
See application file for complete search history.

(56) References Cited

U.S. PATENT DOCUMENTS

| | | | | |
|---|---|---|---|---|
| 4,630,728 A | * | 12/1986 | Matsumoto | G11B 23/0332 206/313 |
| 4,680,662 A | | 6/1987 | Fukushima et al. | |
| 4,750,075 A | * | 6/1988 | Oishi | G11B 23/505 360/133 |
| 5,923,641 A | * | 7/1999 | Fujita | G11B 17/0405 360/133 |
| 6,785,900 B1 | * | 8/2004 | Choi | G11B 23/0306 720/719 |
| 7,027,385 B1 | | 4/2006 | Shimazaki et al. | |
| 2013/0326549 A1 | | 12/2013 | Nishi et al. | |

(Continued)

FOREIGN PATENT DOCUMENTS

| | | | |
|---|---|---|---|
| JP | 61000982 A | * | 1/1986 |
| JP | S61-000982 A | | 1/1986 |
| JP | 04085774 A | * | 3/1992 |

(Continued)

*Primary Examiner* — William J Klimowicz
(74) *Attorney, Agent, or Firm* — Renner Otto Boisselle & Sklar, LLP

(57) ABSTRACT

A disc tray includes a bottom wall including an outer periphery and an inner rib supporter supporting the lowermost disc from below. The bottom wall is thickened from the outer periphery toward the inner rib supporter. The lowermost disc includes a data recording area, an inner rib, and an outer rib. When the lowermost disc is stationary, the outer rib of the lowermost disc and the upper surface of the bottom wall are separated by a gap. When the lowermost disc is inclined in such a manner that part of the outer rib of the lowermost disc comes into contact with the upper surface of the bottom wall, the data recording area of the lowermost disc and the upper surface of the bottom wall are separated by a gap greater than thickness of the outer or inner rib.

8 Claims, 10 Drawing Sheets

(56) References Cited

U.S. PATENT DOCUMENTS

2015/0024161 A1 1/2015 Higaki et al.

FOREIGN PATENT DOCUMENTS

| JP | 04155680 A | * | 5/1992 |
| JP | 2001319449 A | * | 11/2001 |
| JP | 2014-013639 A | | 1/2014 |
| WO | WO 2013/145523 A1 | | 5/2000 |
| WO | WO 2000/028538 A1 | | 3/2013 |

* cited by examiner

DISC TRAY AND TRAY HOLDER

BACKGROUND

1. Technical Field

The present disclosure relates to disc trays for storing discs (information storage media such as CDs and DVDs), and also relates to tray holders for storing such disc trays.

2. Description of the Related Art

Disc devices for supplying discs to disc drives have been developed these years. One such disc device is disclosed in Patent Literature 1 (Japanese Unexamined Patent Application Publication No. 2014-013639). FIG. 13 is a schematic perspective view of this disc device.

This disc device includes two magazine stockers 101 laid along the depth X1 of the device. These magazine stockers 101 are opposed to each other on bottom chassis 111 along the width Y1 of the device. Note that in FIG. 13 the magazine stocker 101 on the nearer side is not illustrated.

Each magazine stocker 101 stores a plurality of magazines 102. Each magazine 102 includes disc tray (also called "magazine tray") 121 for storing discs, and box-shaped tray holder (not shown) for storing disc tray 121. The disc device further includes picker 103 between two magazine stockers 101. Picker 103 pulls disc tray 121 from the tray holder of one magazine 102 chosen from magazines 102, and holds the pulled disc tray 121.

Picker 103 then carries the held disc tray 121 to the vicinity of a plurality of disc drives 104 located at the back of the disc device. Picker 103 is combined with lifter 105 for pushing out a plurality of discs together from disc tray 121.

Disc drives 104, which are tray-loading disc drives, record information into discs or reproduce information. Disc drives 104 are stacked on top of each other along the height Z1 of the device and located adjacent to magazine stockers 101 at the back of the device. The disc device further includes carrier 106 between disc drives 104 stacked adjacent to one of magazine stockers 101 and disc drives 104 stacked adjacent to the other magazine stocker 101.

Carrier 106 holds the stack of discs pushed out by lifter 105, separates one of the stacked discs above the tray pulled from a disc drive 104, and places the separated disc onto the tray.

The disc device further includes electrical circuit/power supply 107 located at the back of the device, behind carrier 106 and disc drives 104. The electrical circuit/power supply 107 includes a controller for controlling the operations of picker 103, disc drives 104, carrier 106, and other components (e.g., the operation of their motors). The controller is coupled to, for example, a host computer for data management. The host computer instructs the controller to write or read data to a specified magazine 102 under the operator's direction. The controller controls the operations of picker 103, disc drives 104, carrier 106, and other components under this direction.

CITATION LIST

Patent Literature

PTL 1: Japanese Unexamined Patent Application Publication No. 2014-013639

SUMMARY

Technical Problem

With the recent advancement of cloud computing, there is a demand for disc devices with larger data capacities. A data capacity could be increased simply by increasing the number of magazines and the number of discs to be stored.

However, these disc devices are often installed in a limited space such as a 19-inch rack, and therefore, it is better to avoid increasing the size of the devices. For this reason, it has been attempted to make the magazines thinner by, for example, thinning the bottom wall of the disc trays so as to reduce the area occupied by the magazines in the disc device.

However, the thinner the bottom wall of a disc tray, the weaker its strength, of course. The thin bottom wall of the disc tray might bend and come into contact with the disc stored in the disc tray. As a result, the disc may be distorted and unable to record and/or reproduce data.

An object of the present disclosure is to provide a disc tray and a tray holder that contribute to the thinning of magazines while preventing distortion of discs.

Solution to Problem

The disc tray according to the present disclosure is a disc tray for storing a plurality of discs stacked together. The disc tray includes a bottom wall including an outer periphery and an inner rib supporter. The bottom wall is thickened from the outer periphery toward the inner rib supporter in the cross section along the thickness of the disc tray. The inner rib supporter supports the lowermost disc of the plurality of discs from below. The lowermost disc includes a data recording area, an inner rib, and an outer rib. When the lowermost disc is stationary, the outer rib of the lowermost disc and the upper surface of the bottom wall of the disc tray are separated by a gap. When the lowermost disc is inclined in such a manner that part of the outer rib of the lowermost disc comes into contact with the upper surface of the bottom wall of the disc tray, the data recording area of the lowermost disc and the upper surface of the bottom wall of the disc tray are separated by a gap greater than the thickness of the outer or inner rib.

Advantageous Effects of the Disclosure

The disc tray according to the present disclosure contributes to the thinning of magazines while preventing distortion of discs.

DETAILED DESCRIPTION

Figure 1:
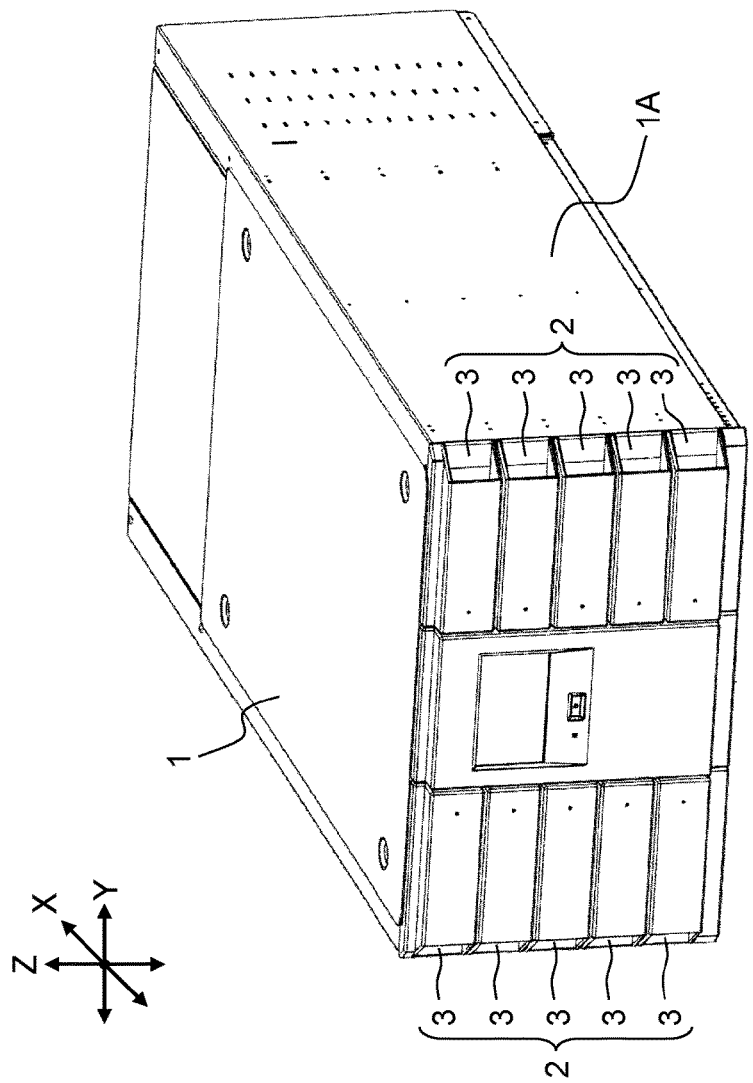
FIG. 1 is an external perspective view of a disc device according to an exemplary embodiment.

Findings on which the Present Disclosure is Based

Through diligent study, the inventors of the present disclosure have made the following findings to achieve a disc tray that contributes to the thinning of magazines while preventing distortion of discs.

As described above, thinning the bottom wall of the disc tray inevitably results in weakening its strength. In the above-described disc device of PTL 1, the disc trays store stacked discs. Therefore, the central part of the bottom wall of the tray is particularly subjected to the load of the discs and tends to be bent downward. The bending of the tray is likely to cause part of the outer periphery of the lowermost of the discs to come into constant contact with the upper surface of the bottom wall of the tray. In this case, the lowermost disc is subjected to the load of all discs and pressed against the upper surface of the bottom wall of the tray. As a result, the lowermost disc may be distorted and unable to record and/or reproduce data. In particular, the base of a double-sided disc, which most contributes to the strength of the disc, is thinner than the base of a one-sided disc. Consequently, the double-sided disc as a whole has a low strength and is more likely to be distorted.

The inside of the magazines is not sealed and is vulnerable to the intrusion of foreign matter. If foreign matter intruded into a magazine comes into contact with the data recording area of a disc and damage the disc, the disc may be unable to record and/or reproduce data.

To prevent this from happening, the inventors have come up with the following ideas: providing an inner rib supporter in the bottom wall of the disc tray so as to support the lowermost disc from below at its inner rib; and thickening the bottom wall of the tray from the outer periphery toward the inner rib supporter. With this structure, the central part of the bottom wall of the tray is thick enough not to be bent, and hence, not to cause the discs to distort. At the same time, this structure enables the outer periphery of the bottom wall of the tray to be thin, contributing to the thinning of the magazines as a whole, while preventing the bottom wall from being unnecessarily thickened.

The inventors also have come up with the idea of making the outer rib of the lowermost disc and the upper surface of the bottom wall of the disc tray separated by a gap when the lowermost disc is stationary. This structure prevents part of the outer rib of the disc from coming into constant contact with the upper surface of the bottom wall of the tray. As a result, the discs are prevented from being distorted.

In the above-described conventional disc device, if, for example, magazines are subjected to vibration during transportation, the lowermost disc may be inclined in such a manner that part of the outer rib of the lowermost disc comes into contact with the upper surface of the bottom wall of the disc tray momentarily. To avoid this happening, the inventors have come up with the idea of making the data recording area of the lowermost disc and the upper surface of the bottom wall of the tray separated by a gap larger than the thickness of the outer or inner rib of the disc when the lowermost disc is inclined. With this structure, if part of the outer rib of the lowermost disc comes into contact with the upper surface of the bottom wall of the tray, the gap prevents the contact between the foreign matter intruded into the magazine and the data recording area of the disc. As a result, the data recording area is prevented from damage.

The inventors have achieved the following invention based on the above-described findings.

According to a first aspect of the present disclosure, a disc tray for storing a plurality of discs stacked together includes a bottom wall including an outer periphery and an inner rib supporter. The bottom wall is thickened from the outer periphery toward the inner rib supporter in the cross section along the thickness of the disc tray. The inner rib supporter supports the lowermost disc of the plurality of discs from below. The lowermost disc includes a data recording area, an inner rib, and an outer rib. When the lowermost disc is stationary, the outer rib of the lowermost disc and the upper surface of the bottom wall of the disc tray are separated by a gap. When the lowermost disc is inclined in such a manner that part of the outer rib of the lowermost disc comes into contact with the upper surface of the bottom wall of the disc tray, the data recording area of the lowermost disc and the upper surface of the bottom wall of the disc tray are separated by a gap greater than the thickness of the outer or inner rib.

According to a second aspect of the present disclosure, in the disc tray of the first aspect, the lowermost disc includes the inner rib, a non-data-recording area, the data recording area, and the outer rib located in sequence from inner to outer sides of the lower surface of the lowermost disc.

According to a third aspect of the present disclosure, in the disc tray of the first or second aspect, when the lowermost disc is stationary, the inclination angle of the upper surface of the bottom wall of the disc tray with respect to the lower surface of the lowermost disc increases from the outer periphery toward the inner rib supporter in the cross section along the thickness of the disc tray.

According to a fourth aspect of the present disclosure, in the disc tray of any one of the first to third aspects, the lowermost disc includes a non-data-recording area, and the upper surface of the bottom wall of the disc tray includes: an area opposing the non-data-recording area; an area opposing the data recording area; and a bending part at the boundary between these two areas.

According to a fifth aspect of the present disclosure, in the disc tray of any one of the first to fourth aspects, the lowermost disc includes a non-data-recording area, and the upper surface of the bottom wall of the disc tray includes a truncated-cone-shaped area opposing the non-data-recording area.

According to a sixth aspect of the present disclosure, in the disc tray of any one of the first to fourth aspects, the upper surface of the bottom wall of the disc tray includes at least one reinforcing rib extending from inner to outer sides of the upper surface of the bottom wall, and the cross section along the thickness of the disc tray is the cross section in which the at least one reinforcing rib extends.

According to a seventh aspect of the present disclosure, in the disc tray of any one of the first to sixth aspects, each of the plurality of discs is a double-sided disc including the outer rib, a non-data-recording area, the data recording area, and the inner rib on both the upper and lower surfaces of each of the plurality of discs.

According to an eighth aspect of the present disclosure, a tray holder for storing the disc tray of the seventh aspect includes an upper wall including: an outer periphery; and an inner rib supporter supporting the inner rib of the uppermost disc of the plurality of discs from above. The upper wall is thickened from the outer periphery toward the inner rib supporter in the cross section along the thickness of the disc tray. When the uppermost disc is stationary, the outer rib of the uppermost disc and the lower surface of the upper wall of the tray holder are separated by a gap. When the uppermost disc is inclined in such a manner that part of the outer rib of the uppermost disc comes into contact with the lower surface of the upper wall of the tray holder, the data recording area of the uppermost disc and the lower surface of the upper wall of the tray holder are separated by a gap greater than thickness of the outer or inner rib.

An exemplary embodiment will be described in detail as follows with reference to the accompanying drawings. In the embodiment, the description of well-known matter and of substantially the same configuration as described earlier may be omitted to avoid redundancy and help those skilled in the art understand them easily.

Note that the attached drawings and the following description are provided to make those skilled in the art fully understand the present disclosure, and are not intended to limit the claimed subject matter.

In the following description, for convenience of explanation, the directional terms such as "upper", "lower", "bottom", "front", and "back" are used on the assumption of that the device is in normal use. However, this does not mean to limit the usage of the disc tray and the tray holder according to the present disclosure.

DETAILED DESCRIPTION OF THE PREFERRED EMBODIMENT

FIG. 1 is an external perspective view of disc device 1 according to the exemplary embodiment. In the embodiment, the lower left and the upper right of FIG. 1 will be referred to as the front and the back, respectively, of device 1.

Disc device 1 includes two magazine stockers 2, which are opposed to each other along the width Y of device 1. Each magazine stocker 2 includes a plurality of magazine units 3 stacked along the height Z of device 1, which is orthogonal or approximately orthogonal to the width Y.

Figure 2:
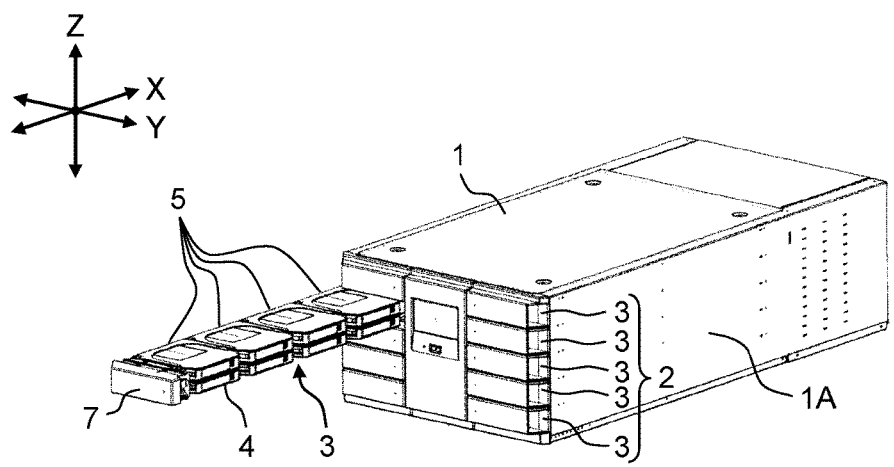
FIG. 2 is a perspective view of the disc device of FIG. 1 from which one magazine unit is pulled out.
Figure 3:
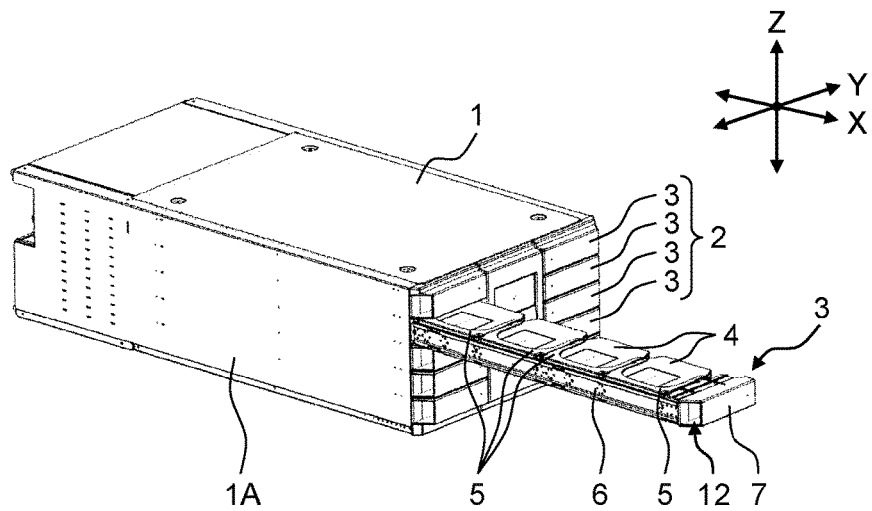
FIG. 3 is a perspective view of the disc device of FIG. 1 from which one magazine unit is pulled out.

FIGS. 2 and 3 are perspective views of disc device 1 from which one magazine unit 3 is pull out. Each magazine unit 3 includes magazine holders 5 for storing magazines 4, and rails 6 slidable along the side surface of housing 1A of disc device 1 in the depth X of device 1. The depth X is orthogonal or approximately orthogonal to the width Y and the height Z as shown in FIG. 2 or 3. Each rail 6 has handle 7 extending along the width Y at the front end of the device.

Each magazine 4 stores a plurality of discs. Device 1 includes a disc supply mechanism (not shown) for supplying a plurality of discs that are stored in one magazine 4 chosen from magazines 4 to the plurality of disc drives. Components other than magazines 4 are not particularly limited and can come in various structures including the structure shown in the above-described disc device of PTL1. Therefore, the components other than magazines 4 will not be described in detail.

Figure 4:
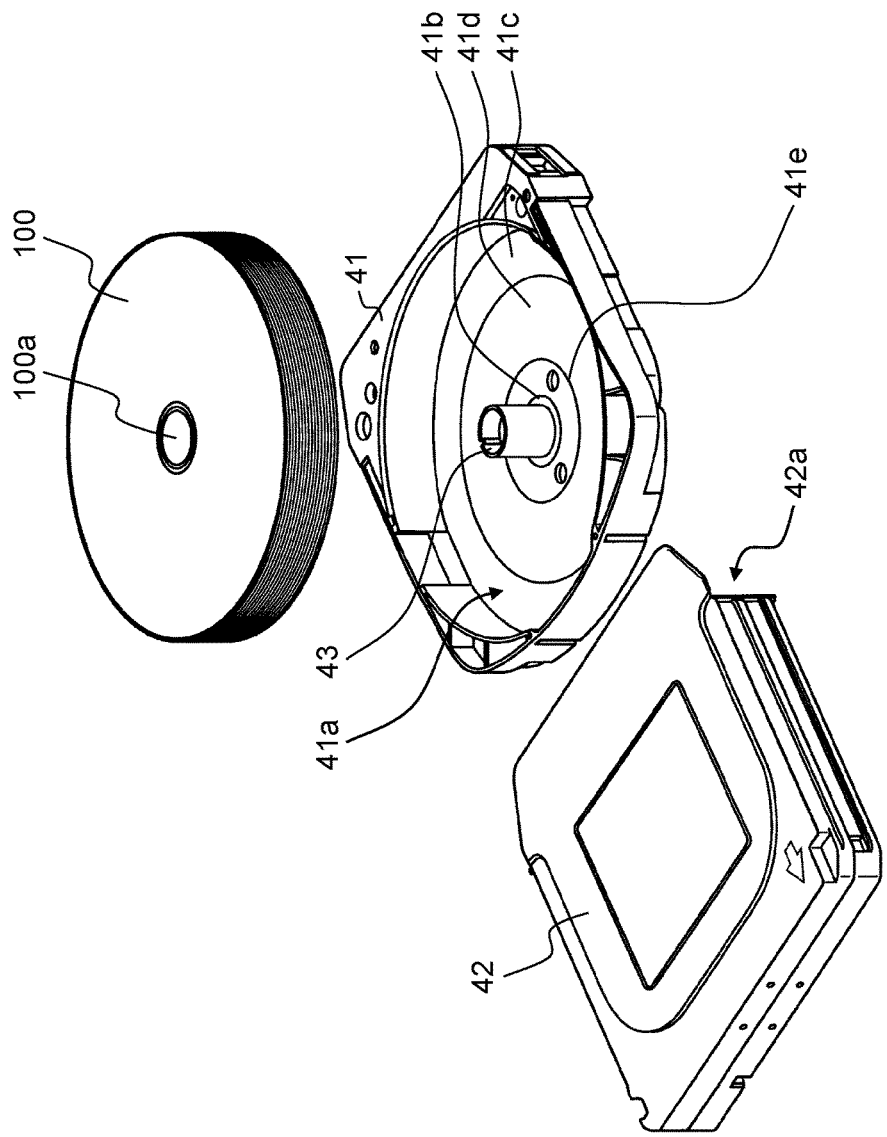
FIG. 4 is an exploded perspective view of a magazine.

FIG. 4 is an exploded perspective view of one magazine 4. As shown in FIG. 4, each magazine 4 includes disc tray 41 for storing a stack of discs (e.g., ten discs) 100, and box-shaped tray holder 42 for storing disc tray 41. Tray holder 42 has, at its front end (one side along the width Y), opening 42a through which disc tray 41 is inserted or removed.

Disc tray 41 has an approximately rectangular contour when viewed two dimensionally. Tray 41 stores a stack of discs 100 in contact with each other. Tray 41 has core bar 43 into which center hole 100a of each disc 100 is inserted to control the movement of discs 100 in the surface direction. Core bar 43 prevents discs 100 from being damaged by the movement in the surface direction.

Figure 5:
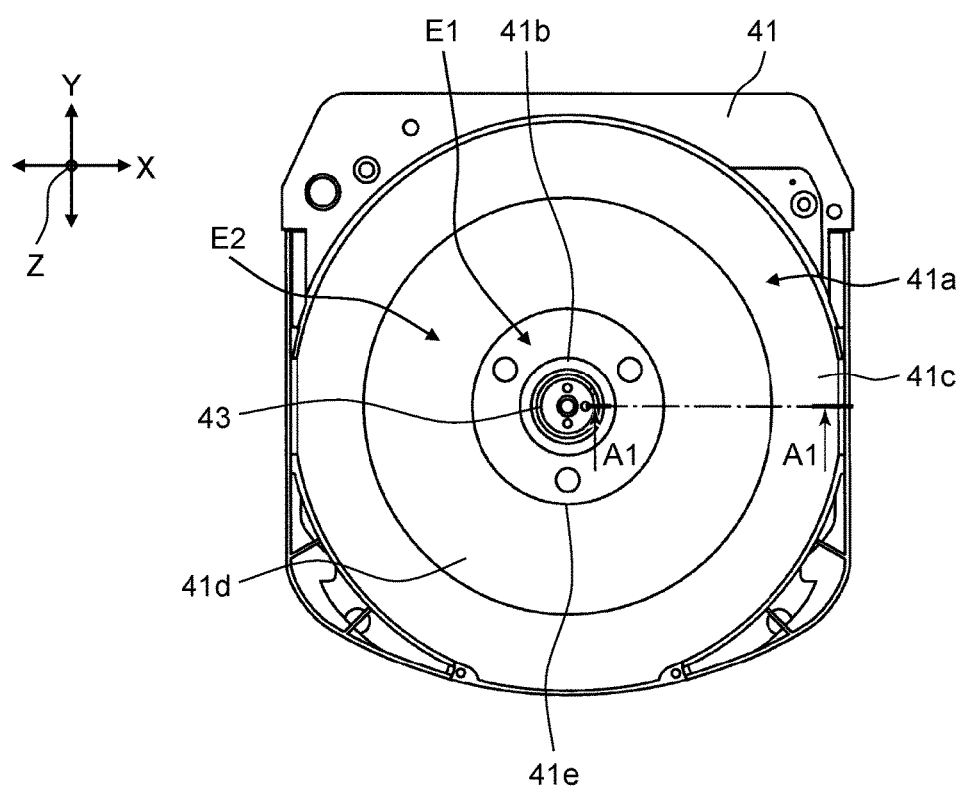
FIG. 5 is a plan view of a disc tray.
Figure 6:
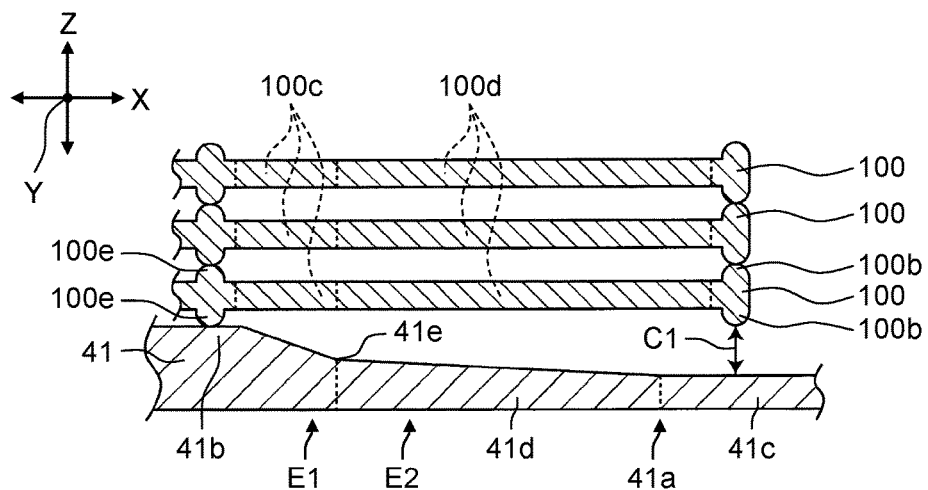
FIG. 6 is a sectional view of the disc tray taken along line A1-A1 of FIG. 5, showing the spatial relationship between each disc and the tray when the discs are stationary.
Figure 7:
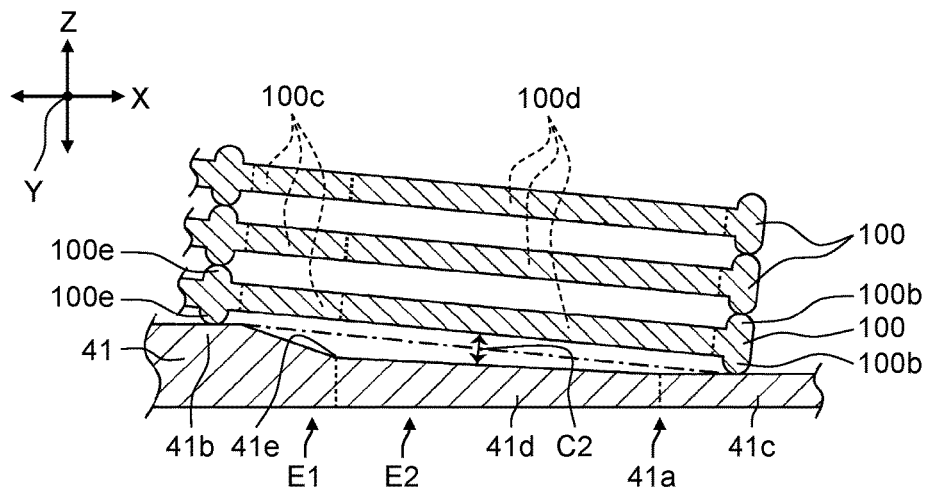
FIG. 7 is a sectional view of the disc tray taken along line A1-A1 of FIG. 5, showing the spatial relationship between each disc and the tray when the discs are inclined.

FIG. 5 is a plan view of disc tray 41. FIG. 6 is a sectional view of tray 41 taken along line A1-A1 of FIG. 5, showing the spatial relationship between each disc 100 and tray 41 when discs 100 are stationary. FIG. 7 is a sectional view of tray 41 taken along line A1-A1 of FIG. 5, showing the spatial relationship between each disc 100 and tray 41 when discs 100 are inclined.

As shown in FIGS. 6 and 7, each disc 100 includes outer rib 100b, non-data-recording area 100c, data recording area 100d, and inner rib 100e. In the exemplary embodiment, each disc 100 is a double-sided disc including outer rib 100b, non-data-recording area 100c, data recording area 100d, and inner rib 100e on both the upper and lower surfaces.

Outer rib 100b is located outside data recording area 100d, and projects in the direction crossing (e.g., orthogonal to) the upper or lower surface of disc 100. Outer rib 100b is, for example, in the shape of a ring whose center coincides with center hole 100a of disc 100.

Inner rib 100e is located inside data recording area 100d, and projects in the direction crossing (e.g., orthogonal to) the upper or lower surface of disc 100. Inner rib 100e is, for example, in the shape of a ring whose center coincides with center hole 100a of disc 100.

Data recording area 100d is the area into which various data is recorded. Non-data-recording area 100c is the area with which the clamper of a disc drive (not shown) comes into contact when various data is recorded into and/or reproduced from data recording area 100d. No data can be recorded into non-data-recording area 100c. Non-data-recording area 100c is located between data recording area 100d and inner rib 100e in the radial direction of disc 100.

Outer rib 100b and inner rib 100e of each disc 100 are in contact with outer ribs 100b and inner ribs 100e, respectively, of vertically adjacent discs 100. Meanwhile, data recording areas 100d of each two vertically adjacent discs 100 have a gap between them and are hence prevented from making contact with each other.

Disc tray 41 has bottom wall 41a including inner rib supporter 41b for supporting from below inner rib 100e of the lowermost disc 100 of all discs 100. When viewed in cross section along the thickness of tray 41 (along the height Z), bottom wall 41a of tray 41 is thickened from outer periphery 41c toward inner rib supporter 41b.

In the exemplary embodiment, as shown in FIG. 6, when the lowermost disc 100 is stationary, the inclination angle of the upper surface of bottom wall 41a of tray 41 with respect to the lower surface of the lowermost disc 100 increases from outer periphery 41c toward inner rib supporter 41b. More specifically, middle part 41d has a larger inclination angle than outer periphery 41c, and inner rib supporter 41b has a larger inclination angle than middle part 41d. In the exemplary embodiment, when the lowermost disc 100 is stationary, its lower surface is parallel to the depth X and the width Y. As a result, when the lowermost disc 100 is stationary, outer rib 100b of the lowermost disc 100 and the upper surface of bottom wall 41a of tray 41 are separated by a gap C1.

A vibration applied to magazines 4 could cause the lowermost disc 100 to be inclined as shown in FIG. 7, bringing part of outer rib 100b of the lowermost disc 100 into contact with the upper surface of bottom wall 41a of tray 41. When the lowermost disc 100 is inclined, data recording area 100d of the lowermost disc 100 and the upper surface of bottom wall 41a of tray 41 are separated by a gap C2 greater than the thickness (height) of outer rib 100b or inner rib 100e.

The upper surface of bottom wall 41a of tray 41 has an area E1 opposing non-data-recording area 100c, an area E2 opposing data recording area 100d, and bending part 41e at the boundary between the areas E1 and E2. Thus, the inner peripheral region of bottom wall 41a opposing non-data-recording area 100c has a larger thickness increase than the remaining region.

In the exemplary embodiment, the area E1 opposing non-data-recording area 100c is truncated-cone-shaped. Thus, the area E1 as a whole is thicker than the area E2.

Figure 8:
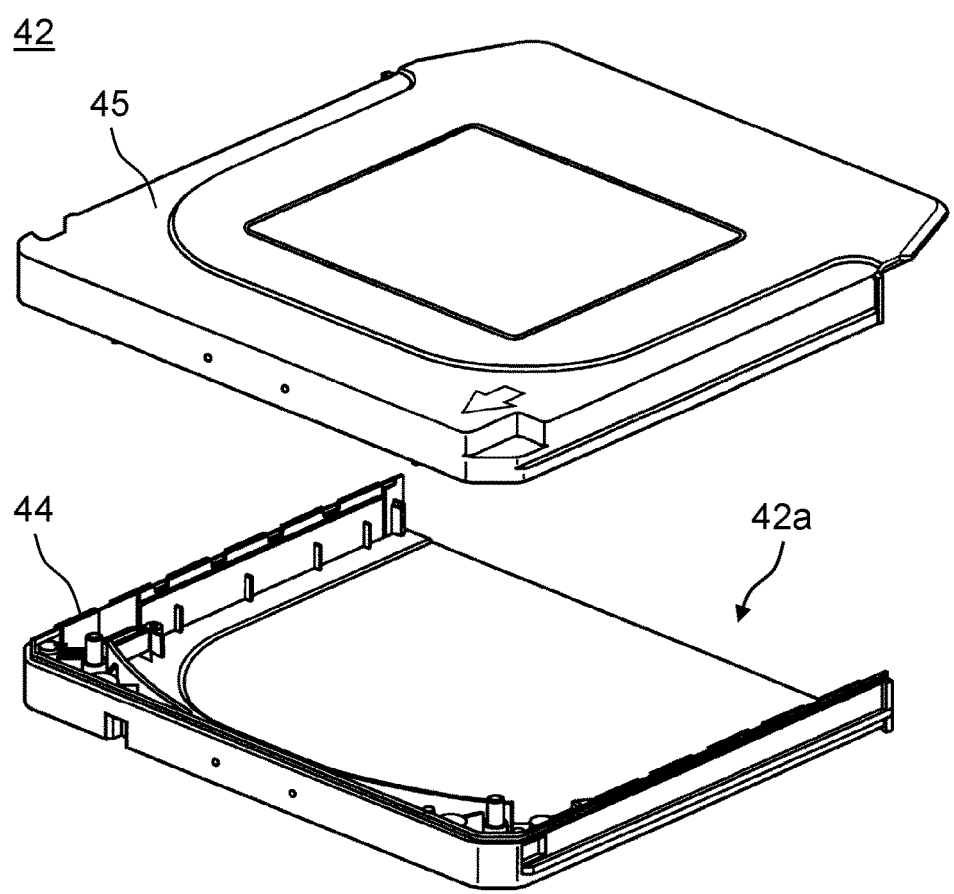
FIG. 8 is an exploded perspective view of a tray holder.

FIG. 8 is an exploded perspective view of tray holder 42. As shown in FIG. 8, holder 42 is composed of lower holder 44 and upper holder 45. Lower holder 44 functions as the lower wall of holder 42 on which disc tray 41 is mounted. Upper holder 45 functions as the upper wall of holder 42 which covers the upper surface of the uppermost disc 100 stored in tray 41.

Figure 9:
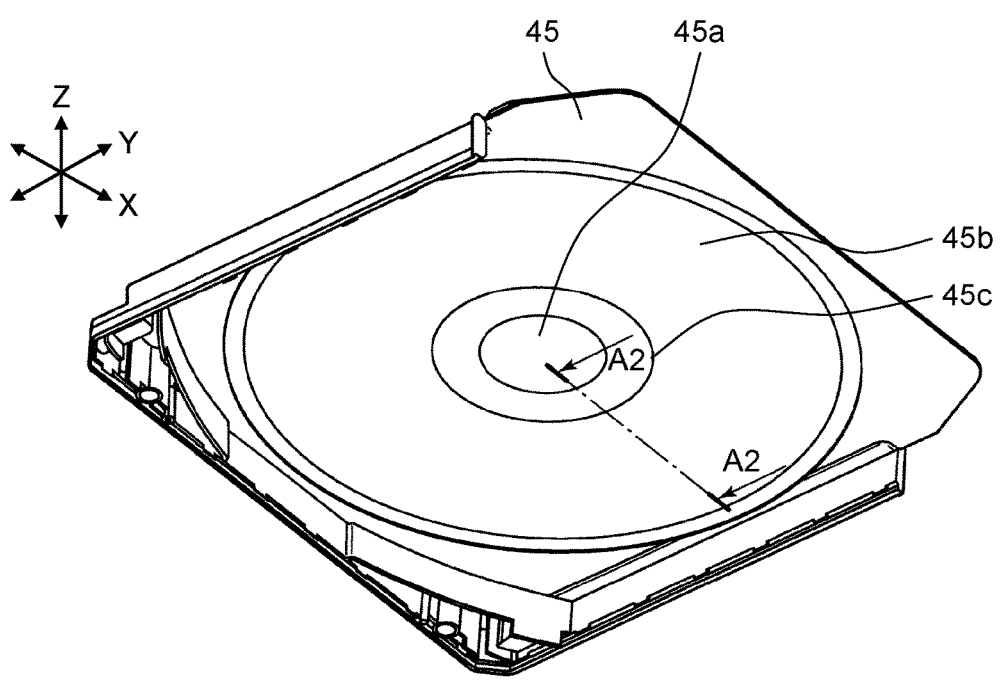
FIG. 9 is a perspective view of the upper holder of the tray holder seen from obliquely below.
Figure 10:
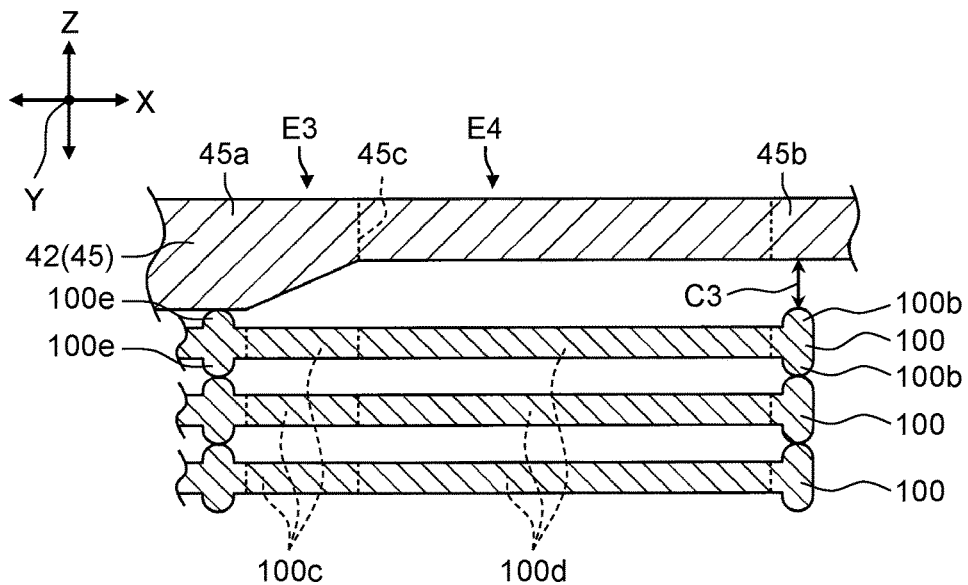
FIG. 10 is a sectional view of the tray holder taken along line A2-A2 of FIG. 9, showing the spatial relationship between each disc and the upper holder when the discs are stationary.
Figure 11:
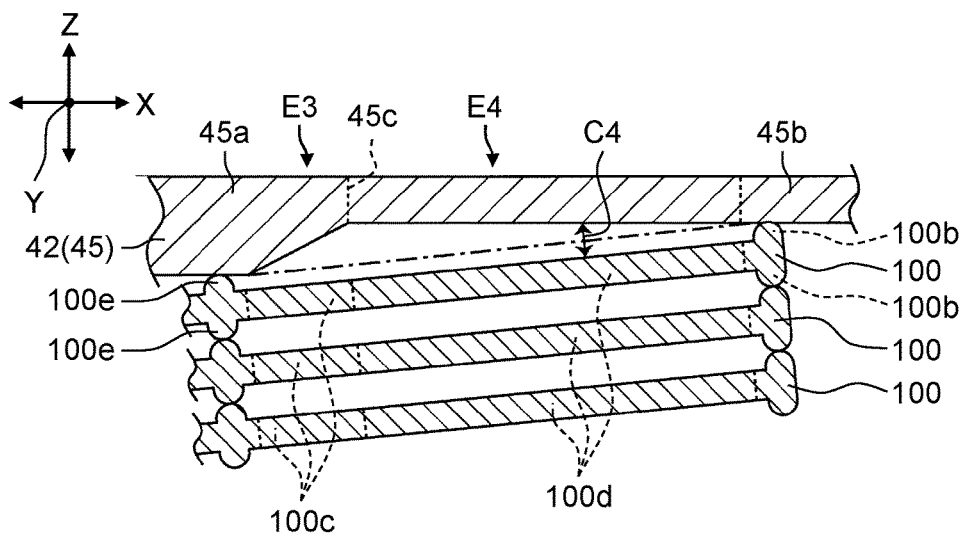
FIG. 11 is a sectional view of the tray holder taken along line A2-A2 of FIG. 9, showing the spatial relationship between each disc and the upper holder when the discs are inclined.

FIG. 9 is a perspective view of upper holder 45 seen from obliquely below. FIG. 10 is a sectional view of tray holder 42 taken along line A2-A2 of FIG. 9, showing the spatial relationship between each disc 100 and upper holder 45 when discs 100 are stationary. FIG. 11 is a sectional view of tray holder 42 taken along line A2-A2 of FIG. 9, showing the spatial relationship between each disc 100 and upper holder 45 when discs 100 are inclined.

As shown in FIGS. 9 to 11, upper holder 45 includes inner rib supporter 45a for supporting from above inner rib 100e of the uppermost disc 100 of all discs 100.

When viewed in cross section along the thickness of tray 41, upper holder 45 is thickened from outer periphery 45b toward inner rib supporter 45a. In the exemplary embodiment, when the uppermost disc 100 is stationary, its upper surface is parallel to the depth X and the width Y. As a result, when the uppermost disc 100 is stationary, outer rib 100b of the uppermost disc 100 and the lower surface of upper holder 45 are separated by a gap C3.

A vibration applied to magazines 4 could cause the uppermost disc 100 to be inclined as shown in FIG. 11, bringing part of outer rib 100b of the uppermost disc 100 into contact with the lower surface of upper holder 45. When the uppermost disc 100 is inclined, data recording area 100d of the uppermost disc 100 and the lower surface of upper holder 45 are separated by a gap C4 greater than the thickness (height) of outer rib 100b or inner rib 100e.

The lower surface of upper holder 45 has an area E3 opposing non-data-recording area 100c, an area E4 opposing data recording area 100d, and bending part 45c at the boundary between the areas E3 and E4. Thus, the inner peripheral region of upper holder 45 opposing non-data-recording area 100c has a larger thickness increase than the remaining region.

In the exemplary embodiment, the area E3 opposing non-data-recording area 100c is truncated-cone-shaped. Thus, the area E3 as a whole is thicker than the area E4.

As described hereinbefore, according to the exemplary embodiment, bottom wall 41a of tray 41 is thickened from outer periphery 41c toward inner rib supporter 41b. With this structure, the central part of bottom wall 41a of tray 41 is thick enough not to bend, and hence, not to cause discs 100 to distort. At the same time, this structure enables outer periphery 41c of bottom wall 41a of tray 41 to be thin, contributing to the thinning of magazines 4 as a whole, while preventing bottom wall 41a from being unnecessarily thickened.

According to the exemplary embodiment, when the lowermost disc 100 is stationary, outer rib 100b of the lowermost disc 100 and the upper surface of bottom wall 41a of tray 41 are separated by the gap C1. With this structure, the gap C1 prevents part of outer rib 100b of the lowermost disc 100 from coming into constant contact with the upper surface of bottom wall 41a of tray 41, thereby preventing distortion of discs 100.

According to the exemplary embodiment, as shown in FIG. 7, if the lowermost disc 100 is inclined, data recording area 100d of the lowermost disc 100 and the upper surface of bottom wall 41a of tray 41 are separated by the gap C2. With this structure, if part of outer rib 100b of the lowermost disc 100 comes into contact with the upper surface of bottom wall 41a of tray 41, the gap C2 prevents the contact between the foreign matter intruded into magazine 4 and data recording area 100d of the disc 100. As a result, data recording area 100d of the lowermost disc 100 is prevented from damage.

Thus, the exemplary embodiment prevents discs 100 from distortion and data recording area 100d from damage, so that data can be recorded into and/or reproduced from discs 100 more securely.

According to the exemplary embodiment, the upper surface of bottom wall 41a of tray 41 has bending part 41e at the boundary between the area E1 opposing non-data-recording area 100c and the area E2 opposing data recording area 100d. The inner peripheral region of bottom wall 41a has a larger thickness increase than the remaining region. Even if damaged by foreign matter, non-data-recording area 100c does not affect the recording and/or reproducing of data. Therefore, the downward bending of the central part of bottom wall 41a can be further reduced by increasing the thickness of the area E1, and hence, by increasing the mean thickness of the central part of bottom wall 41a of tray 41.

According to the exemplary embodiment, the area E1 of bottom wall 41a opposing non-data-recording area 100c is truncated-cone-shaped, so that the area E1 as a whole is thicker than area E2. This structure improves the strength of the central part of bottom wall 41a, thereby further reducing the downward bending of the central part of bottom wall 41a.

According to the exemplary embodiment, upper holder 45 is thickened from outer periphery 45b toward inner rib supporter 45a. This structure increases the thickness and strength of the central part of upper holder 45. As a result, even if magazines 4 are placed upside down and inner rib supporter 45a of upper holder 45 is subjected to the load of all discs 100, the central part of upper holder 45 is prevented from bending, and hence, discs 100 are prevented from distortion. At the same time, outer periphery 45b of upper holder 45 can be thin, contributing to the thinning of magazines 4 as a whole, while preventing upper holder 45 from being unnecessarily thickened.

According to the exemplary embodiment, when the uppermost disc 100 is stationary, outer rib 100b of the uppermost disc 100 and the lower surface of upper holder 45 are separated by the gap C3. This structure prevents part of outer rib 100b of the uppermost disc 100 from coming into constant contact with the lower surface of upper holder 45, thereby preventing distortion of the uppermost disc 100.

According to the exemplary embodiment, if the uppermost disc 100 is inclined as shown in FIG. 11, data recording area 100d of the uppermost disc 100 and upper holder 45 are separated by the gap C4. With this structure, even if part of outer rib 100b of the uppermost disc 100 comes into contact with the lower surface of upper holder 45, the gap C4 prevents the contact between the foreign matter intruded into magazine 4 and data recording area 100d of the uppermost disc 100. As a result, data recording area 100d is prevented from damage.

According to the exemplary embodiment, the lower surface of upper holder 45 has bending part 45c at the boundary between the area E3 opposing non-data-recording area 100c and the area E4 opposing data recording area 100d. The inner peripheral region of upper holder 45 has a larger thickness increase than the remaining region. Therefore, the bending of the central part of upper holder 45 can be further reduced by increasing the thickness of the area E3, and hence, by increasing the mean thickness of the central part of bottom wall 41a of tray 41.

According to the exemplary embodiment, the area E3 of upper holder 45 opposing non-data-recording area 100c is truncated-cone-shaped. Thus, the area E3 as a whole is thicker than the area E4. This structure improves the strength of the central part of upper holder 45, thereby further reducing the bending of the central part of upper holder 45.

Figure 12:
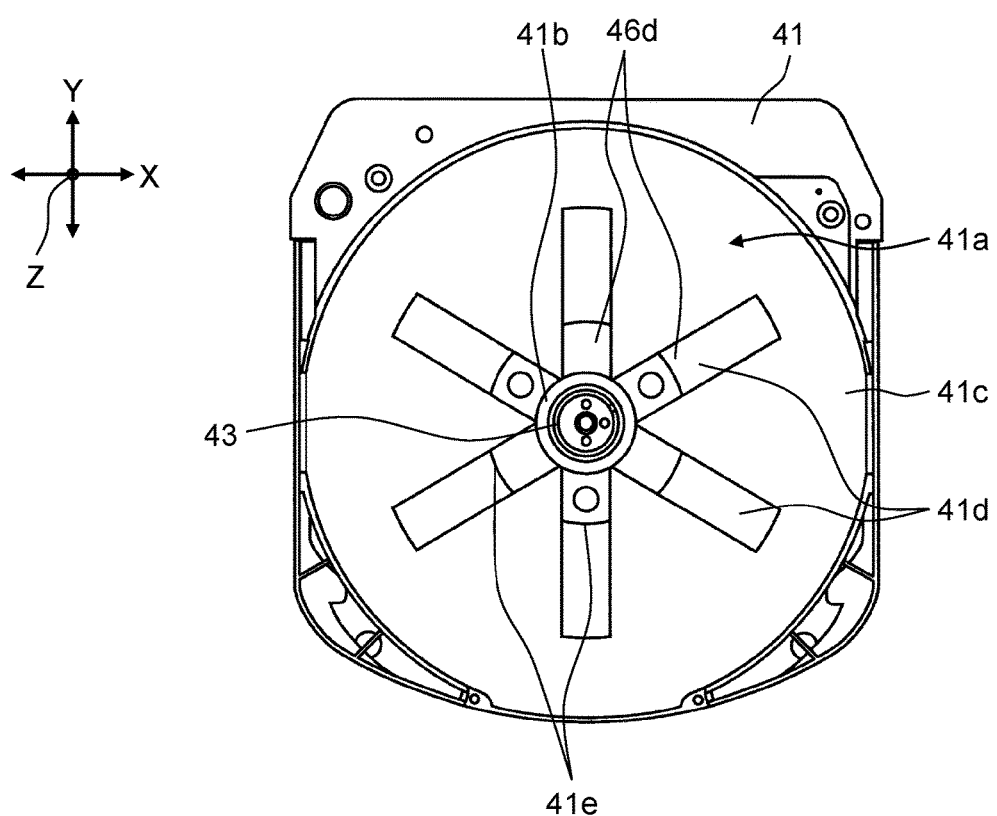
FIG. 12 is a plan view of a modified example of the disc tray of FIG. 5.
Figure 13:
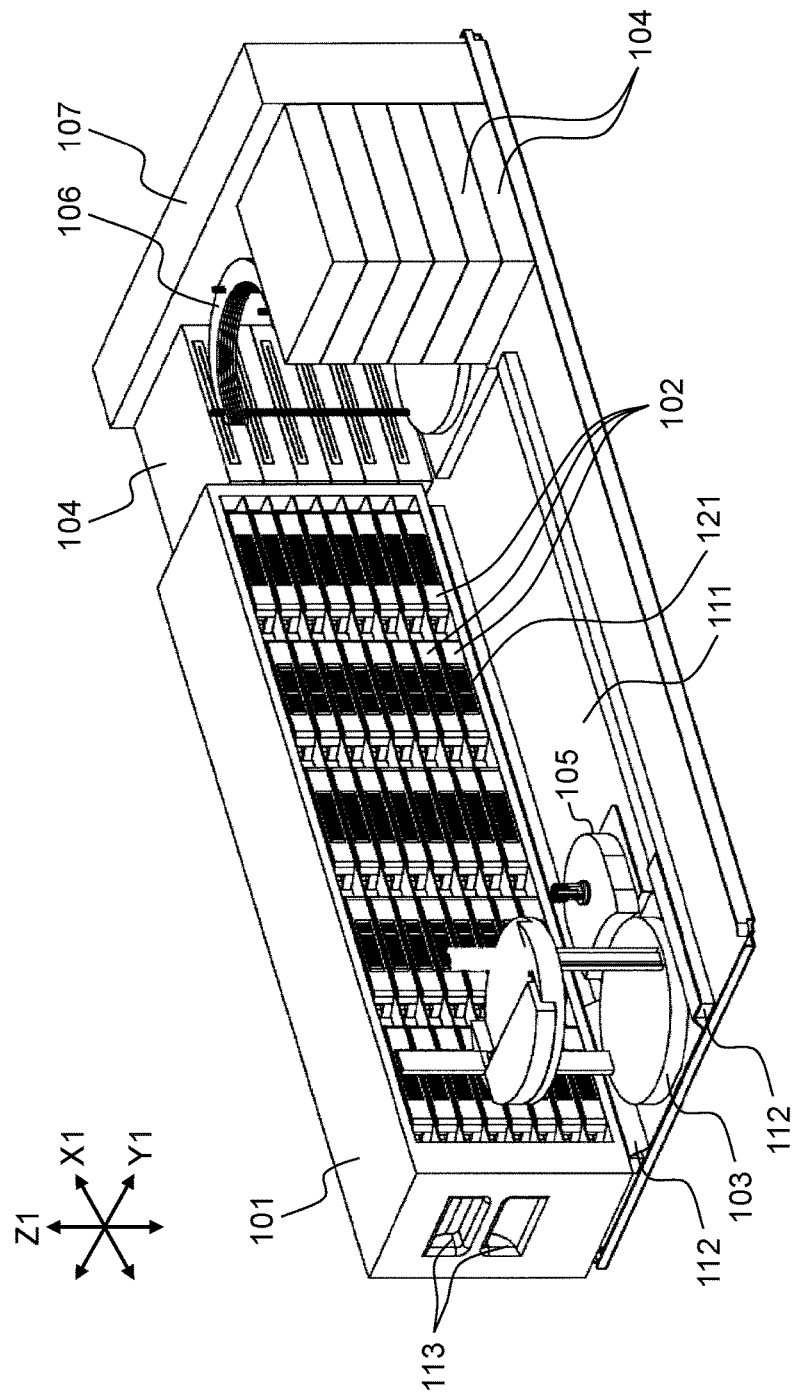
FIG. 13 is a schematic perspective view of a conventional disc device.

According to the exemplary embodiment, the area E1 of bottom wall 41a of tray 41 is truncated-cone-shaped, so that bottom wall 41a is thickened from outer periphery 41c toward inner rib supporter 41b. However, the present disclosure is not limited to this structure. For example, as shown in FIG. 12, it is possible to provide reinforcing rib 46d extending from the inner to outer periphery on the upper surface of bottom wall 41a, and to thicken bottom wall 41a from outer periphery 41c toward inner rib supporter 41b when viewed in cross section along the extending direction of reinforcing rib 46d. This structure increases the space between the lower surface of each disc 100 and the region of bottom wall 41a where reinforcing rib 46d is not placed. This structure prevents data recording area 100d of each disc 100 from being damaged by foreign matter intruded into the space. The number of reinforcing rib 46d is at least one.

Similarly, it is possible to provide a reinforcing rib in the area E3 of the lower surface of upper holder 45 and to thicken upper holder 45 from outer periphery 45b toward inner rib supporter 45a when viewed in cross section along the extending direction of the reinforcing rib. This structure achieves the similar effect.

Thus, the present disclosure has been described in detail by taking the exemplary embodiment as its example with reference to the accompanying drawings. Note that some of the components described in detail and shown in the accompanying drawings are not essential components for the present disclosure, and should not be regarded as essential components just because they are described in detail and shown in the accompanying drawings.

The above-described exemplary embodiment exemplifies the techniques of the present disclosure. Therefore, various modification, replacement, addition, and omission can be made within the range of the claims and their equivalents.

INDUSTRIAL APPLICABILITY

The disc tray and the tray holder according to the present disclosure contribute to the thinning of magazines while preventing distortion of discs. This disc tray and this tray holder are particularly useful in a disc device for supplying discs to a plurality of disc drives.

REFERENCE MARKS IN THE DRAWINGS 1 disc device
1A housing
2 magazine stocker
3 magazine unit
4 magazine
5 magazine holder
6 rail
7 handle
41 disc tray
41a bottom wall
41b inner rib supporter
41c outer periphery
41d middle part
41e bending part
42 tray holder
42a opening
43 core bar
44 lower holder
45 upper holder
45a inner rib supporter
45b outer periphery
45c bending part
46d reinforcing rib
100 disc
100a center hole
100b outer rib
100c non-data-recording area
100d data recording area
100e inner rib

What is claimed is:

1. A disc tray for storing a plurality of discs stacked together, the disc tray comprising a bottom wall including an outer periphery and an inner rib supporter, the bottom wall being thickened from the outer periphery toward the inner rib supporter in a cross section along thickness of the disc tray, the inner rib supporter supporting a lowermost disc of the plurality of discs from below, the lowermost disc including a data recording area, an inner rib, and an outer rib, wherein
when the lowermost disc is stationary, the outer rib of the lowermost disc and an upper surface of the bottom wall of the disc tray are separated by a gap, and
when the lowermost disc is inclined in such a manner that part of the outer rib of the lowermost disc comes into contact with the upper surface of the bottom wall of the disc tray, the data recording area of the lowermost disc and the upper surface of the bottom wall of the disc tray are separated by a gap greater than thickness of the outer rib or the inner rib.

2. The disc tray according to claim 1, wherein the lowermost disc includes the inner rib, a non-data-recording area, the data recording area, and the outer rib located in sequence from inner to outer sides of a lower surface of the lowermost disc.

3. The disc tray according to claim 1, wherein when the lowermost disc is stationary, an inclination angle of the upper surface of the bottom wall of the disc tray with respect to a lower surface of the lowermost disc increases from the outer periphery toward the inner rib supporter in the cross section along the thickness of the disc tray.

4. The disc tray according to claim 1, wherein
the lowermost disc includes a non-data-recording area, and
the upper surface of the bottom wall of the disc tray includes:
an area opposing the non-data-recording area;
an area opposing the data recording area; and
a bending part at a boundary between the area opposing the non-data-recording area and the area opposing the data recording area.

5. The disc tray according to claim 1, wherein
the lowermost disc includes a non-data-recording area, and
the upper surface of the bottom wall of the disc tray includes a truncated-cone-shaped area opposing the non-data-recording area.

6. The disc tray according to claim 1, wherein
the upper surface of the bottom wall of the disc tray includes at least one reinforcing rib extending from inner to outer sides of the upper surface of the bottom wall, and
the cross section along the thickness of the disc tray is a cross section in which the at least one reinforcing rib extends.

7. The disc tray according to claim 1, wherein each of the plurality of discs is a double-sided disc including the outer rib, a non-data-recording area, the data recording area, and the inner rib on both an upper surface and a lower surface of each of the plurality of discs.

8. A tray holder for storing the disc tray of claim 7, the tray holder comprising an upper wall including:
an outer periphery; and
an inner rib supporter supporting the inner rib of an uppermost disc of the plurality of discs from above, the upper wall being thickened from the outer periphery toward the inner rib supporter in the cross section along the thickness of the disc tray,
wherein
when the uppermost disc is stationary, the outer rib of the uppermost disc and a lower surface of the upper wall of the tray holder are separated by a gap, and
when the uppermost disc is inclined in such a manner that part of the outer rib of the uppermost disc comes into contact with the lower surface of the upper wall of the tray holder, the data recording area of the uppermost disc and the lower surface of the upper wall of the tray holder are separated by a gap greater than thickness of the outer rib or the inner rib.

\* \* \* \* \*